Figure 1:
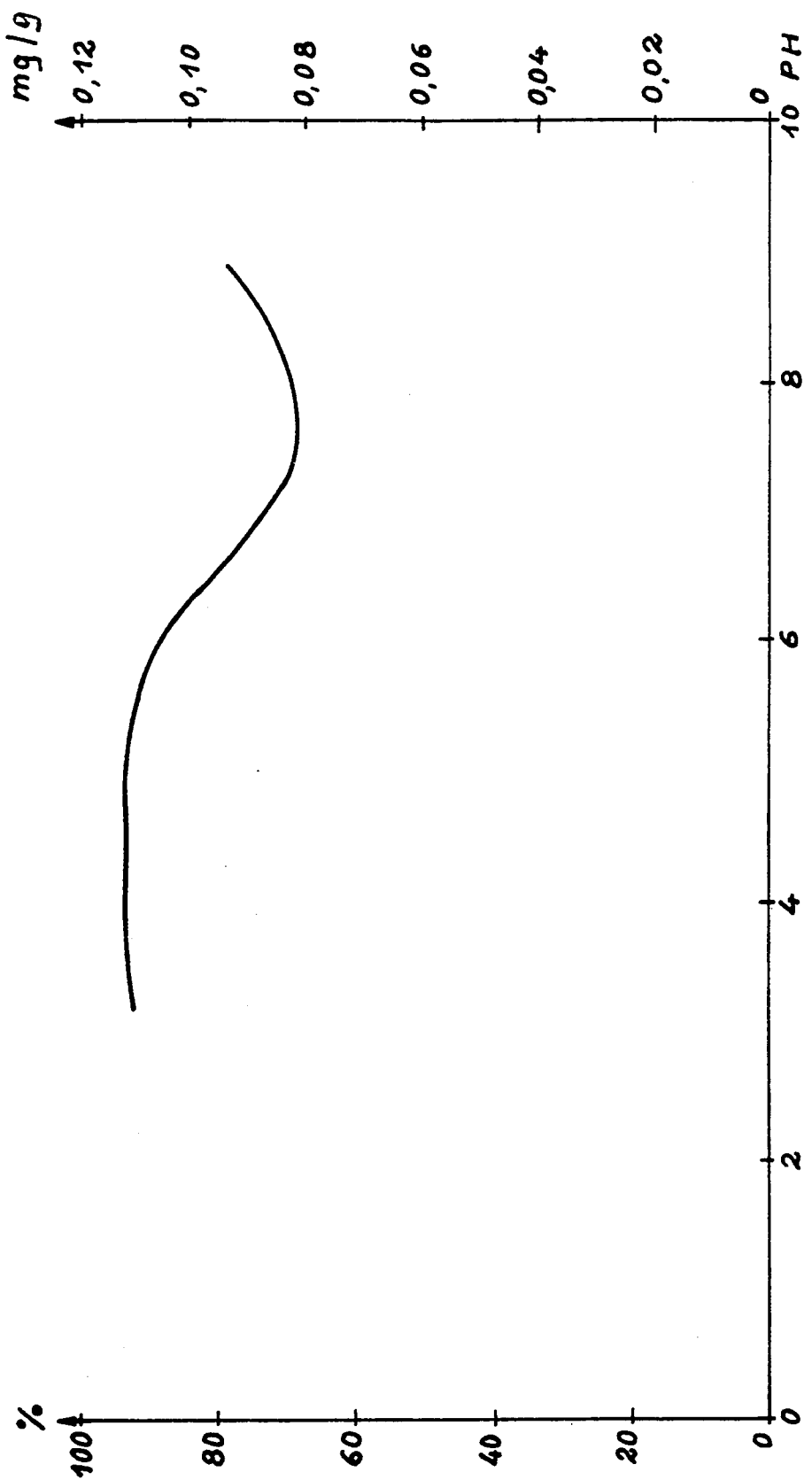

United States Patent [19]

LeMaire et al.

[11] Patent Number: 5,372,794
[45] Date of Patent: Dec. 13, 1994

[54] PROCESS FOR THE SEPARATION OF CERTAIN ELEMENTS FROM AQUEOUS SOLUTIONS RESULTING FROM THE REPROCESSING OF SPENT NUCLEAR FUELS

[75] Inventors: Marc LeMaire, Villeurbanne; Jacques Foos, Orsay; Alain Guy, Pontearré; Micheline Draye, Lyons; Rodolph Chomel, Camaret sur Aygues; René Chevillotte, Sauveterre, all of France

[73] Assignee: Compagnie Generale des Matieres Nucleaires, France

[21] Appl. No.: 25,856

[22] Filed: Mar. 3, 1993

[30] Foreign Application Priority Data

Mar. 3, 1992 [FR] France .................. 92 02516

[51] Int. Cl.⁵ .................................. C22B 60/00
[52] U.S. Cl. ................................ 423/2; 423/49
[58] Field of Search ........................ 423/2, 49

[56] References Cited

U.S. PATENT DOCUMENTS

| | | | |
|---|---|---|---|
| 3,725,261 | 4/1973 | Friedman | 210/38 |
| 4,197,195 | 4/1980 | Ochsenfeld et al. | 210/21 |
| 4,663,129 | 5/1987 | Atcher et al. | 423/2 |
| 4,818,503 | 4/1989 | Nyman et al. | 423/49 |
| 4,971,729 | 11/1990 | White | 423/2 |

FOREIGN PATENT DOCUMENTS 2370498  6/1978  France .

OTHER PUBLICATIONS

Frezenius Zeitscrift Fur Analytiche Chemie Springer Verlag 1968, Berlin, pp. 432–440, Friedrich Wolf, Rudiger Hauptmann und Dieter Warnecke, "Synthese Und Metallion–Selektivitat Von 4–Vinylpyridin/Acrylnitril Bzw. Acrylsaure/P–Divinylbenzol–Copolymeren".

*Primary Examiner*—Donald P. Walsh
*Assistant Examiner*—Frederick H. Voss

[57] ABSTRACT

The invention relates to a process for the separation of at least one element such as Nb, Sb, Ce+Pr, actinides and elements from groups VIIb and VIII of the Periodic Classification of Elements from aqueous solutions resulting from the reprocessing of spent nuclear fuels.

This process consists of contacting said aqueous solution with a solid resin based on a vinyl pyridine polymer or copolymer and separating from said solution the resin used for fixing said element or elements.

The resin is in particular a poly(vinyl-4-pyridine) powder in crosslinked from and the separated elements are e.g. ruthenium, rhodium, palladium, technetium, manganese, cobalt, iron, nickel, cerium and praseodymium.

16 Claims, 3 Drawing Sheets

PROCESS FOR THE SEPARATION OF CERTAIN ELEMENTS FROM AQUEOUS SOLUTIONS RESULTING FROM THE REPROCESSING OF SPENT NUCLEAR FUELS

The present invention relates to a process for the separation of at least one element such as Nb, Sb, Ce+Pr, actinides and elements from groups VIIb (Mn, Tc, Re) and VIII (Fe, Co, Ni, Ru, Rh, Pd, Os, Ir, Pt) of the Periodic Classification of Elements present in an aqueous solution resulting from the reprocessing of spent nuclear fuels.

It more particularly applies to the recovery of these elements in aqueous effluents of low, average or high activity, as well as in concentrates of fission products and solutions for dissolving spent nuclear fuels. It is also applicable to the decontamination of effluents having a high content of salts of existing effluent processing stations.

The irradiation of nuclear fuels in power reactors leads to the production of numerous fission products, whose atomic masses are 70 to 160. These fission products occur in different solutions and effluents produced at the end of the fuel cycle.

Thus, the low activity effluents, i.e. whose specific activity $\beta$ does not exceed $0.37 GBq/m^3$ (or $10^{-2} Ci/m^3$) for elements other than $^{137}Cs$ and $^{90}Sr$, generally contain manganese antimony, ruthenium, cesium and cobalt in radioactive form. The average or moderate activity effluents with a specific activity $\beta$ between 0.37 and $37 GBq/m^3$ (or between $10^{-2}$ and $1 Ci/m^3$) e.g. contain manganese, ruthenium, cobalt, cesium, cerium and praseodymium in radioactive form. The high activity effluents, i.e. with a specific activity $\beta$ between $37 GBq/m^3$ and $1.8 TBq/m^3$ (or between 1 and $50 Ci/m^3$), can comprise ruthenium, cesium, cerium, praseodymium, niobium and antimony. The average and high activity effluents also have an activity between $10^{-5}$ and $3.10^{-2} mCi/l$, due to the presence of elements such as Pu, Am and Cm.

The dissolving solutions for spent nuclear fuels are generally nitric solutions incorporating actinides, numerous metals and substantially all the fission products, particularly ruthenium 106, cesium 137 and 134, antimony 125, europium 154, cerium and praseodymium 144.

The fission product concentrates, which are nitric solutions obtained after the separation of uranium and plutonium from the spent nuclear fuel dissolving solutions, incorporate numerous elements including in particular iron, nickel, molybdenum, copper, ruthenium, rhodium and technetium.

Therefore one of the aims of the invention is to separate certain elements present in these effluents or solutions. Among these elements are in particular metals from the platinum group such as palladium, rhodium and ruthenium, which are valorizable elements, particularly rhodium due to its use in catalytic converters for the car industry. It would also be of interest to have processes making it possible to permit the effective separation of ruthenium, rhodium and palladium.

Separation processes for these metals are e.g. described by R. P. Bush in Platinum Metals Rev., 1991, 35, 4, pp.202–208; by McDuffie in ORML/TM-6654, 1979; by Hazelton et al in PML-5758-UC-70, 1986; and by MacCragh in U.S. Pat. No. 3,672,875.

These known processes relating to the separation of precious metals from effluents or dissolving fines, make use of various methods such as extraction by liquid metals, volatilization in the case of ruthenium, extraction by organic solvents in the case of rhodium and palladium, precipitation, adsorption on activated carbon or reduction by reducing resins of the amine-borane type for forming deposits of noble metals on resins, etc. However, the procedures described in these documents are not satisfactory, because they are difficult to perform, or do not make it possible to recover adequate quantities of these metals.

Thus, it should be noted that in treated aqueous solutions or effluents, the contents of Nb, Sb and metals of groups VIIb and VIII to be recovered are very low compared with those of the other elements present in the solution, such as uranium and plutonium in the case of dissolving solutions and sodium in the case of certain aqueous effluents.

The present invention specifically relates to a process for the separation of at least one element chosen from among Nb, Sb, actinides, Ce, Pr and elements of group VIIb and group VIII, which has the advantage of being easy to perform, being applicable to different effluent types and leading to high recovery yields.

According to the invention, the process for the separation of at least one element chosen from among Nb, Sb, actinides, Ce+Pr and elements of groups VIIb and VIII of the Periodic Classification of Elements, present in an aqueous solution resulting from the reprocessing of spent nuclear fuels, consists of contacting said aqueous solution with a solid resin based on vinyl pyridine polymer or copolymer and separating from said solution the resin which has fixed at least one of the said elements.

In this process, the use of a solid resin based on vinyl pyridine polymer or copolymer is very advantageous, because said resin has a very good affinity for Nb, Sb, actinides, Ce+Pr and group VIIb and VIII elements. Moreover, these resins have a good thermal stability and a good oxidation resistance and can be used in an acid medium, particularly a nitric medium.

Moreover, when the polyvinyl pyridine resin becomes less effective due to a saturation by the separated elements, it is possible to regenerate it by washing it with water, an acid solution, e.g. 0.1 to 4M $HNO_3$, or an alkaline solution, e.g. 0.1M $NH_4OH$.

The vinyl pyridine polymers used can e.g. be poly-2-(vinyl pyridine) or poly-4-(vinyl pyridine).

The vinyl pyridine copolymers which can be used are e.g. copolymers of vinyl pyridine and divinyl benzene.

Preferably, according to the invention, use is made of poly-4-(vinyl pyridine) in accordance with the formula:

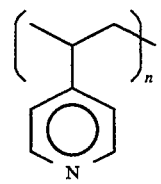

which can be crosslinked by divinyl benzene.

This resin, which is generally marketed in basic form, can be used in a saline acid medium, e.g. in the form:

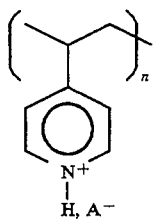

with A- representing an anion such as NO3- or Cl-.

The resin is generally in the form of a powder, whose grain size is chosen by the user as a function of his needs.

Preference is given to the use of crosslinked polyvinyl-4-pyridine with a grain size of 15 to 60 mesh.

It is stable up to 260° C. under atmospheric pressure, it resists oxidizing and reducing agents and is not sensitive to irradiation. Thus, following irradiation by a cesium 137 source producing a dose rate of 2M rad s/h, for 8 h 24 min, the resin has undergone no transformation which can be detected by elementary analysis and the carbon, hydrogen and nitrogen contents are substantially the same. It is also impossible to detect any modification by infrared spectroscopy and analysis by differential colorimetry shows that the morphological appearance has undergone no change, the glass transition point remaining unchanged. Therefore irradiation has little or no effect on the poly(vinyl pyridine). Finally, the use of poly(vinyl pyridine) is advantageous, because by modifying certain processing conditions, e.g. the nitric acidity and the contact time with the solution, it is possible to render it selective for certain elements.

Generally, the starting aqueous solutions are nitric solutions, which preferably have a nitric acid concentration between $10^{-7}$ and 4 mole/l and they are contacted with the solid resin for between 1 min and 24 h.

The resin quantities used more particularly depend on the contents of the elements to be extracted. In general, use is made of 10 to 500 g of resin per liter of aqueous solution.

In order to perform the process according to the invention, it is possible to use conventional apparatuses for the contacting of powder products with liquids, which are of the discontinuous or continuous types, such as fixed or fluidized bed exchange columns.

Normally working takes place at ambient temperature and pressure, but in certain cases it is possible to work at different pressures and temperatures, e.g. to speed up the reaction.

The process according to the invention can in particular be used for extracting ruthenium, rhodium and/or palladium from aqueous solutions resulting from the reprocessing of spent nuclear fuels.

When it is wished to more particularly extract ruthenium, the nitric acid concentration of the aqueous solution is at the most equal to 1 mole/l, preferably $10^{-7}$ to 0.1 mole/l and the contacting of this solution with the resin takes place for between 10 and 60 min. The extraction kinetics can be improved by adding chloride ions to the aqueous solution.

In the case when it is wished to more particularly extract rhodium and palladium, the aqueous solution preferably has a nitric acid concentration of 1 to 2 mole/l and contacting of the solution with the resin takes less than 10 min.

As has been shown hereinbefore, the process according to the invention can be used for treating different types of effluents and solutions resulting from the reprocessing of spent nuclear fuels.

Thus, it can be used for separating ruthenium, niobium, antimony, manganese, cobalt, cerium, praesodymium, plutonium, curium and americium from average and high activity effluents; for separating Fe, Ni, Rh, Ru, Co and Tc from fission product concentrates; and for separating Pd, Ru, Rh, Tc, Co, Ni, Fe from irradiated fuel dissolving solutions.

The invention is described in greater detail hereinafter with reference to non-limitative examples and relative to the attached drawings, wherein show:

FIG. 1 A diagram showing the ruthenium extraction level variations (as a %) as a function of the pH of the aqueous starting solution.

FIGS. 2 to 5 Diagrams illustrating the percentages of reextracted elements as a function of the treated effluent volume.

In all the examples use is made of a crosslinked poly-4-(vinyl pyridine) powder with a grain size of approximately 60 mesh.

EXAMPLE 1: SEPARATION OF RUTHENIUM

In this example use is made of the process according to the invention for treating an aqueous effluent having a ruthenium concentration of 0.49 mg/l and a nitric acid concentration of 1.38 mole/l.

In order to extract the ruthenium present in this effluent, 40 ml of effluent are contacted with 1 g of poly-4-(vinyl pyridine) (PVP) resin accompanied by magnetic stirring for 30 min. The PVP resin is then separated on a paper filter and the residual ruthenium in the solution is dosed by a plasma 2000-type PERKIN ELMER plasma torch and the ruthenium extraction rate is determined. The latter is 85%, which corresponds to a fixing of 0.02 mg of ruthenium per gramme of PVP resin. Therefore the ruthenium extraction yield is very satisfactory.

EXAMPLE 2: SEPARATION OF RUTHENIUM

In this example the ruthenium is extracted from an aqueous effluent highly charged with salts, which contains 1.38 mole/l of HNO3, 2 g/l of Na+, 6 mg/l of K+ and 1 mg/l of ruthenium.

In order to carry out said separation, contacting takes place under magnetic stirring and for 20.5 h of 1 g of poly-4-(vinyl pyridine) and 40 ml of aqueous solution containing 1 mg/l of ruthenium. The resin is then separated from the solution on a paper filter and the residual ruthenium in the solution is dosed by a plasma torch. This gives a ruthenium extraction rate of 66.5%, which corresponds to $2.66.10^{-2}$ mg of ruthenium per gramme of resin.

The dosing of sodium and potassium in the filtered solution indicates that they have not been extracted by the resin.

EXAMPLE 3: SEPARATION OF RUTHENIUM

The same operating procedure as in example 2 is followed using an effluent having the same composition, except with regards to its ruthenium content which is 0.3 mg/l. Under these conditions and after stirring for 20.5 h, the ruthenium extraction rate is 100%, which corresponds to $1.2.10^{-2}$ mg of ruthenium per gramme of resin.

Therefore the use of polyvinyl pyridine makes it possible to obtain a 100% extraction rate for ruthenium in the case of very low ruthenium contents and even when there are high sodium and potassium contents.

EXAMPLE 4: SEPARATION OF RUTHENIUM

The ruthenium is extracted from an aqueous solution having a nitric acid concentration of 1.38 mole/l and which contains 0.5 mg/l of ruthenium, 2 g/l of sodium and 6 mg/l of potassium and to which is added sodium chloride in order to have a sodium chloride concentration of 1 mole/l.

2.5 g of polyvinyl pyridine are contacted, accompanied by stirring, with 100 ml of the solution, accompanied by magnetic stirring at 750 r.p.m. and for 90 minutes. The PVP resin is then separated on a paper filter and the residual ruthenium content of the solution is determined on a plasma torch.

These operations are repeated using contact times of 3 h, 8 h and 24.25 h. The results obtained are given in the following table 1.

TABLE 1

| CONTACT TIME (H) | X EXTRACTION |
| --- | --- |
| 0 | 0 |
| 1.5 | 68.5 |
| 3 | 68.5 |
| 8 | 68.5 |
| 24.25 | 72 |

On the basis of these results, it can be seen that the maximum extraction yield is substantially reached after 1.5 h. However, when the same separation takes place in the absence of Cl- ions, it is necessary to wait 8 h for the resin to start extracting the ruthenium. Therefore the presence of chloride ions is beneficial, because it speeds up the ruthenium extraction.

EXAMPLE 5: SEPARATION OF RUTHENIUM

In this example the ruthenium is separated from effluents containing sodium and potassium and the influence of the pH on the extraction rate is studied. To this end contacting takes place between 10 ml of solution containing traces of Ru, 6 mg/l of potassium and 2 g/l of sodium and having nitric acid concentrations corresponding to pH-values between 3 and 9 with approximately 0.2 g of poly-4-(vinyl pyridine), accompanied by stirring for 1 h. The resin is then separated on a paper filter and the residual ruthenium is dosed in the solution by a plasma torch.

The attached drawing shows the ruthenium extraction rate and the ruthenium quantity fixed per gramme of resin as a function of the pH of the solution. It can be seen that the ruthenium is extracted more efficiently for acid pH-levels below 6, i.e. nitric acid concentrations above $10^{-6}$ mole/l.

EXAMPLES 6 to 9: SEPARATION OF RHODIUM

In these examples the rhodium is extracted from aqueous solutions containing approximately 2 mmole/l of rhodium and having nitric acid concentrations as given in table 2.

To carry out the extraction approximately 0.2 g of poly-4-(vinyl pyridine) (PVP) are contacted with 10 ml of aqueous solution, accompanied by horizontal stirring for 24 h. The polyvinyl pyridine is then separated from the solution by filtering on a paper filter and then the residual rhodium in the solution is determined by atomic absorption. The results obtained are also given in table 2.

TABLE 2

| Ex. | (HNO$_3$) (mole/l) | % Extraction | Resin Weight (g) | Fixed Rh Quantity per g of Resin (mg/g) |
| --- | --- | --- | --- | --- |
| 6 | 0.7 | 20 | 0.23 | 1.3 |
| 7 | 1.38 | 30 | 0.19 | 3.2 |
| 8 | 2.8 | 9 | 0.28 | 0.66 |
| 9 | 4.2 | 2 | 0.23 | 0.17 |

These results show that the rhodium is fixed less well to the PVP when the acidity of the medium is too high. The extraction maximum is observed for nitric acid concentrations of 1 to 2 mole/l.

EXAMPLES 10 TO 13: SEPARATION OF RHODIUM

These examples follow the same operating procedure as in examples 6 to 9, but using different polyvinyl pyridine quantities with an aqueous solution containing 2 mmole/l of rhodium and 1.38 mole/l of nitric acid. The polyvinyl pyridine quantities used and the results obtained are given in table 3.

TABLE 3

| Ex. | [Poly(vinyl pyridine)] (in g/l) | % Extraction | Fixed Rh Quantity per g of Resin (mg/g) |
| --- | --- | --- | --- |
| 10 | 10 | 26 | 5.50 |
| 11 | 20 | 30 | 3.20 |
| 12 | 30 | 34 | 2.4 |
| 13 | 40 | 40 | 2.14 |

These results show that the extraction yield increases with the polyvinyl pyridine quantity used.

EXAMPLES 14 TO 16: SEPARATION OF PALLADIUM

In these examples extraction takes place of the palladium present in an aqueous solution containing approximately 1 mmole/l of palladium and 1.38 mole/l of nitric acid by contacting 10 ml of solution with polyvinyl pyridine quantities corresponding to concentrations of 2 to 40 g/l for 24 h and accompanied by horizontal stirring. The polyvinyl pyridine is then separated on a paper filter and the residual palladium is determined by atomic absorption. The polyvinyl pyridine quantities used and the results obtained are given in table 4.

TABLE 4

| Ex. | PVP Concentration (g/l) | Initial Pd Concentration (mg/l) | % Extraction | Fixed Pd Quantity per g of Resin (mg/l) |
| --- | --- | --- | --- | --- |
| 14 | 2 | 91 | 100 | 45.5 |
| 15 | 10 | 86 | 100 | 8.6 |
| 16 | 40 | 86 | 100 | 2.1 |

These results show that palladium extraction takes place easily and 100% for initial PVP concentrations of 2 to 40 g/l.

The results obtained in the above examples demonstrate that by appropriately choosing the acidity of the initial aqueous solution, the contact time and the resin quantity used and by adding appropriate ions such as Cl-, it is possible to selectively extract ruthenium, rhodium or palladium.

EXAMPLE 17: SEPARATION OF RUTHENIUM

In this example separation takes place of the ruthenium present in high activity effluents having a nitric acid concentration of 0.6 mole/l and containing, apart from the ruthenium, cesium 137 and cesium 134. To carry out the extraction contacting takes place under mechanical stirring of 3 ml of effluent and 200 mg of poly-4-(vinyl pyridine) (PVP) for 75 min. The resin is then separated from the effluent by filtration and the ruthenium and cesium contents of the collective solution are determined. The results obtained and the ruthenium and cesium contents of the starting solution are given in table 5.

TABLE 5

|  | Ru106 | Cs137 | Cs134 | Salt Charge, including 90% NaNO$_3$ | (H+) |
|---|---|---|---|---|---|
| Initial solution (mg/l) | $1.14 \cdot 10^{-2}$ | 1.43 | $2.86 \cdot 10^{-2}$ | $367 \, g \cdot l^{-1}$ | 0.6M |
| After decontamination (mg/l) | $4.59 \cdot 10^{-3}$ | 1.32 | $2.64 \cdot 10^{-2}$ | | |
| % extraction | 59.7 | 7.7 | 7.6 | | |
| 0 mg/g | $1.02 \cdot 10^{-4}$ | $1.63 \cdot 10^{-3}$ | $3.24 \cdot 10^{-5}$ | | |

This table reveals that polyvinyl pyridine is very effective for retaining ruthenium 106, because the extraction yield is 60%, which corresponds to a fixing rate of $1.02 \cdot 10^{-4}$ mg of ruthenium per g of resin. However, if the same treatment is carried out on low activity effluents, the decontamination is less effective, because the decontamination rate increases with the activity of the initial solution.

EXAMPLES 18 TO 23: SEPARATION OF RUTHENIUM, MANGANESE AND COBALT

In these examples contacting takes place of 3 ml of medium activity effluent (MA) with the composition given in table 6 and different weights of polyvinyl pyridine crosslinked by 2% divinyl benzene for 40 min and accompanied by stirring. The nitric acidity of the effluent is 0.1 mole/l. Following this contact time, the polyvinyl pyridine is separated from the effluent and the ruthenium, manganese, cobalt, cesium and cerium+praseodymium 144 concentrations of the separated effluent are determined. The results obtained are given in table 6.

TABLE 6

|  | $106_{Ru}$ | $54_{Mn}$ | $60_{Co}$ | $134_{Cs}$ | $137_{Cs}$ | Ce + Pr 144 |
|---|---|---|---|---|---|---|
| MA Effluents After Treatment MBq $\cdot l^{-1}$ | 1.3 | 0.021 | 0.13 | 0.23 | 8.9 | 0.23 |
| (mCi $\cdot l^{-1}$) | (0.036) | (0.00057) | (0.0035) | (0.0062) | (0.24) | $6.2 \cdot 10^{-3}$ |

| Ex. | PVP Weight mg | % Extraction | | | | | |
|---|---|---|---|---|---|---|---|
| 18 | 10 | 2.8 | 0 | 0 | 0 | 0 | 12.9 |
| 19 | 50 | 55.6 | 0 | 0 | 0 | 0 | 25.8 |
| 20 | 75 | 61.1 | 12.3 | 48.6 | 3 | 0 | 29 |
| 21 | 100 | 77.5 | 14 | 71.4 | 2 | 0 | 100 |
| 22 | 200 | 86.7 | 44 | 95.4 | 5 | 0 | 100 |
| 23 | 500 | 87.8 | 84.2 | 100 | 0 | 0 | 100 |

Thus, this table shows that it is possible to effectively eliminate the ruthenium, manganese, cobalt, cerium and praseodymium from medium activity effluents, but the cesium is not extracted.

EXAMPLE 24: EXTRACTION OF RUTHENIUM, NIOBIUM AND ANTIMONY

In this example the ruthenium, niobium and antimony are extracted from high activity (HA) effluents having the HNO$_3$ composition and concentration given in Table 7.

To extract ruthenium, 50 g of resin are contacted with 1 liter of effluent, accompanied by stirring for 30 min. followed by the separation of the resin from the effluent by filtering and determination of the ruthenium, antimony, cesium and niobium contents of the filtered effluent. The results are given in Table 7.

TABLE 7

|  | $95_{No}$ | $106_{Ru}$ | $125_{Sb}$ | $137_{Ca}$ | $134_{Ca}$ |
|---|---|---|---|---|---|
| Activity before treatment MEq. l-1 | 1.6 | 137 | 20 | 115 | 22 |
| (mCi.l-1) | (0.043) | (3.7) | (0.54) | (3.1) | (0.6) |
| Initial HNO$_3$ in mole/l | % Extraction | | | | |
| 0 | 0 | 0 | 0 | 0 | 0 |
| 0.089 | 100 | 93 | 43 | 0 | 0 |
| 0.7 | 47 | 31 | 31 | 0 | 0 |
| 0.9 | 53 | 35 | 26 | 0 | 0 |
| 1.3 | 44 | 39 | 33 | 0 | 0 |
| 1.9 | 1 | 6 | 4 | 0 | 0 |

This table makes it clear that a very high ruthenium and niobium decontamination rate is obtained when the nitric acid concentration of the starting solution is 0.089 mole/l, which corresponds to the standard nitric acid concentration of high activity effluents.

EXAMPLE 25: SEPARATION OF RUTHENIUM

In this example extraction takes place of ruthenium from an effluent concentrated by evaporation and having the composition given in table 8. To this end contacting takes place between 200 mg of polyvinyl-4-pyridine for 75 min with 3 ml of effluent, followed by the separation of the polyvinyl pyridine by filtration and the determination of the ruthenium and cesium contents of the effluent. The results obtained are also given in table 8.

TABLE 8

| [HNO$_3$] = 0.6M<br>Resin weight = 200 mg<br>Contact time = 75 min | $106_{Ru}$ | $137_{Cs}$ | $134_{Cs}$ |
|---|---|---|---|
| Activity of the effluents before treatment GBq · $1^{-1}$ | 1.4 | 4.8 | 1.37 |
| (mCi · $1^{-1}$) | (38) | (130) | (37) |
| % Extraction | 56 | 0 | 0 |

This table shows that a very satisfactory ruthenium extraction yield is obtained.

EXAMPLE 26: SEPARATION OF TECHNETIUM, RUTHENIUM, RHODIUM, IRON, NICKEL AND COBALT

In this example extraction takes place of technetium, ruthenium, rhodium, iron, nickel and cobalt of a concentrate of fission products containing numerous elements, i.e. the solution obtained following the first separation cycle of uranium and plutonium from a spent nuclear fuel dissolving solution To this end contacting takes place between 2 ml of concentrate and 1 g of polyvinyl pyridine (PVP) for 4 h 15 min, accompanied by mechanical stirring and in 5 min sequences. The polyvinyl pyridine is filtered a first time and is then washed with 18 ml of 1N nitric acid, followed by the filtering of the resin a second time, which is then dissolved hot in 15 ml of sulphuric acid. The solution obtained after the first filtration and the resin dissolving solution are analyzed by gamma spectrometry, alpha spectrometry and atomic emission spectrometry (ICP).

The results obtained show that under these conditions the metals Na, Cs, Mg, Sr, Ba, Cd, B, Al, La, Pr, Ce, Gd, Sm, Eu, Am, Cm, Np are not extracted by PVP, but uranium is extracted with a 20% yield. However, metals of groups VIIb and VIII are extracted, as is shown in the following table 9.

TABLE 9

| EXTRACTED METALS | | | | | |
|---|---|---|---|---|---|
| Group VIIB | Tc | | | | |
| % Extraction | 98 ± 1(*) | | | | |
| Group VIII | Fe | Ni | Rh | Ru | Co |
| % Extraction | 57 ± 1(*) | 95 ± 1(*) | 97 ± 1(*) | 88 ± 9(*) | 55 |

*Standard variation calculated on three experiments.

Thus, the resin leads to a very good extraction of technetium, ruthenium, rhodium, iron, nickel and cobalt with a good selectivity with respect to alkali metals, alkaline earth metals and actinides.

Table 10 gives the distribution of metal cations in % by weight in the fission product concentrate and on PVP resin.

TABLE 10

| Distribution of metal cations % by weight In concentrate | Fe | Ni | Rh | Ru | Tc | Total |
|---|---|---|---|---|---|---|
| PF | 4.2 | 0.91 | 0.42 | 1.7 | 0.79 | 8.51 |
| Fixed on PVP | 37 | 14.4 | 6.4 | 26.5 | 12.4 | 100 |

This table demonstrates the interest of using polyvinyl pyridine for separating metals of groups VIIb and VIII. The fixed cations can then be recovered in aqueous solution, if desired, by dissolving the resin in $H_2SO_4$.

EXAMPLE 27: SEPARATION OF TECHNETIUM, RUTHENIUM, RHODIUM, PALLADIUM, IRON AND NICKEL

In this example extraction takes place of technetium, ruthenium, rhodium, palladium, iron and nickel from irradiated dissolving solutions by contacting 1 g of polyvinyl pyridine with 10 ml of dissolving solution, accompanied by mechanical stirring and for 75 min. After contacting, the resin is filtered a first time and the solution analyzed by gamma spectrometry and atomic emission spectrometry (ICP) in order to determine the contents thereof in palladium, ruthenium, rhodium, technetium, nickel and iron.

The resin separated by filtration is washed with 18 ml of 1N nitric acid, followed by the filtration of the resin, the dissolving thereof in 5 ml of concentrated sulphuric acid and the analysis of the dissolving solution by gamma spectrometry and atomic emission spectrometry (ICP). The results obtained are given in table 11.

TABLE 11

| | Pd | Ru | Rh | Rc | Ni | Fe |
|---|---|---|---|---|---|---|
| Composition of the dissolving solution (mg/l) | 334 | 240 | 121 | 3.4 | 4.9 | 72 |
| % Fixed metal | 94 | 66 | 65 | 100 | 92 | 89 |

This table shows that the extraction percentages for palladium, ruthenium, rhodium and technetium are very high, particularly for technetium and palladium.

The following table 12 gives the percentages and distribution of the recovered metals.

TABLE 12

| Elements | Composition of Solution (mg/l) | Distribution of metals in dissolving solution % | % metal recovered after dissolving PVP | Distribution of recovered metals |
|---|---|---|---|---|
| U | 360 000 | 99.6 | 9 · $10^{-5}$ | 0.95 |
| Pu | 1030 | 0.28 | 0.3 | 10.9 |
| Pd | 30.5 | 0.0084 | 41 | 18.7 |
| Ru | 73 | 0.020 | 15 | 16.6 |
| Rh | 27.7 | 0.0077 | 30 | 12.7 |

TABLE 12-continued

| Elements | Composition of Solution (mg/l) | Distribution of metals in dissolving solution % | % metal recovered after dissolving PVP | Distribution of recovered metals |
|---|---|---|---|---|
| Tc | 30 | 0.0083 | 25.3 | 11.5 |
| Ni | 9.9 | 0.0027 | 12 | 1.8 |
| Fe | 111.5 | 0.031 | 10.8 | 18 |

This table shows that 25% technetium, 41% palladium, 15% ruthenium and 30% rhodium are recovered. Thus, washing the resin with nitric acid makes it possible to eliminate the partly coextracted metals.

The decontamination factors are $1.1 \cdot 10^{-6}$ for uranium, 317 for plutonium and 874 for gamma emitters (Ru 106 deduced), which is very satisfactory.

The results of the first two examples demonstrate that the polyvinyl pyridine resin does not extract the alkali metals and alkaline earth metals, as well as the trivalent metals, does not extract or only very slightly extracts transuranium elements, but leads to a very good extraction of transition metals.

The effectiveness of the resin decreases when the salt charge increases. Thus, for a dissolving solution, the salt charge is close to 200 g/l and the polyvinyl pyridine exchange capacity is under the operating conditions used equal to 3.1 mg of palladium/g of resin, 0.8 mg of rhodium/g of resin, 1.6 mg of ruthenium/g of resin and above 0.034 mg of technetium/g of resin.

For a fission product concentrate, the salt charge is close to 100 g/l and the resin exchange capacity is, under these conditions, 0.7 mg Rh/g of resin, 3 mg Ru/g of resin and 1.4 mg Tc/g of resin.

Thus, it is possible to isolate the precious metals Ru, Rh, Pd and Tc from fission product concentrated solutions and spent nuclear fuel dissolving solutions. It is also possible to improve the decontamination of these metals by optimizing the fixing conditions and the washing procedure for the charged resin, e.g. by isolating the ruthenium by volatilization, followed by the washing of the rich aqueous phase, e.g. with tributyl phosphate, in order to eliminate the residual plutonium and uranium traces.

EXAMPLE 28: DECONTAMINATION OF AN AVERAGE ACTIVITY EFFLUENT

In this example contacting takes place between 3 ml of average or medium activity effluent having the composition given in table 13 and a nitric acid concentration of $5.10^{-3}$ mole/l with 67 g/l of polyvinyl pyridine (200 mg) for 30 min and accompanied by stirring. After separating the polyvinyl pyridine from the effluent, the concentrations of plutonium, americium, curium and fission products of the separated effluent are determined. The results obtained are given in table 13. These results show that the polyvinyl pyridine extracts numerous alpha emitters and numerous fission products, with the exception of cesium and strontium.

TABLE 13

| Element | Concentrate in Effluent mg/l | MBq/l | % Extracted |
|---|---|---|---|
| Total Pu | $7 \cdot 10^{-4}$ | | >93.8 |
| $238_{Pu}$ | $2 \cdot 10^{-5}$ | | >98.8 |
| $241_{As}$ | $8 \cdot 10^{-5}$ | | >98.8 |
| $242_{Cm}$ | $1 \cdot 10^{-8}$ | | >90.9 |
| $244_{Cm}$ | $1 \cdot 10^{-6}$ | | >96.1 |
| Total fission products | | 1.5688 | 72.5 |

TABLE 13-continued

| Element | Concentrate in Effluent mg/l | MBq/l | % Extracted |
|---|---|---|---|
| $144_{Ce}$ | | 0.1517 | 100 |
| $106_{Ru}$ | | 0.814 | 57.3 |
| $137_{Cs}$ | | 0.2516 | 5.9 |
| $60_{Co}$ | | 0.3589 | 78.4 |
| $54_{Mn}$ | | 0.0925 | 93.6 |
| $85_{Sr}$ | | 0.0444 | 8.3 |

EXAMPLE 29: DECONTAMINATION OF AN AVERAGE ACTIVITY EFFLUENT

In this example decontamination takes place of an average or medium activity effluent having the composition given in table 14 and operating in the following way.

TABLE 14

| Constituent | Concentration mg/l | mCi/l | mole/l |
|---|---|---|---|
| HNO$_3$ | | | 0.005 |
| Mg | 5 | | |
| K | 10 | | |
| Co | 14 | | |
| Na | 6000 | | |
| U | 5 | | |
| $60_{Co}$ | | $1 \cdot 10^{-2}$ | |
| $106_{Ru}$ | | $2.3 \cdot 10^{-2}$ | |
| $134_{Cs}$ | | $7 \cdot 10^{-4}$ | |
| $137_{Cs}$ | | $7 \cdot 10^{-4}$ | |
| $155_{Eu}$ | | $2 \cdot 10^{-4}$ | |
| $144_{Ce} + 144_{Pr}$ | | $9 \cdot 10^{-3}$ | |
| Pu | $8.6 \cdot 10^{-4}$ | | |
| $244_{Cm}$ | $2.7 \cdot 10^{-7}$ | | |
| $242_{Cm}$ | $2.9 \cdot 10^{-9}$ | | |
| $241_{Am}$ | $2.1 \cdot 10^{-5}$ | | |

The effluent is made to circulate in a column having an internal diameter of 0.8 cm and containing 1 g of polyvinyl pyridine, which corresponds to a polyvinyl pyridine height of 4.7 cm, the effluent being supplied under low pressure at the top of the column and using a metering pump with a delivery of 3 ml/min. At the bottom of the column is collected the treated effluent and it is analyzed to determine the elements contained therein, using atomic emission spectrometry in the case of elements present in a weight quantity, gamma spectrometry in the case of gamma emitter radioelements and alpha spectrometry in the case of alpha emitted radioelements.

Figure 2:
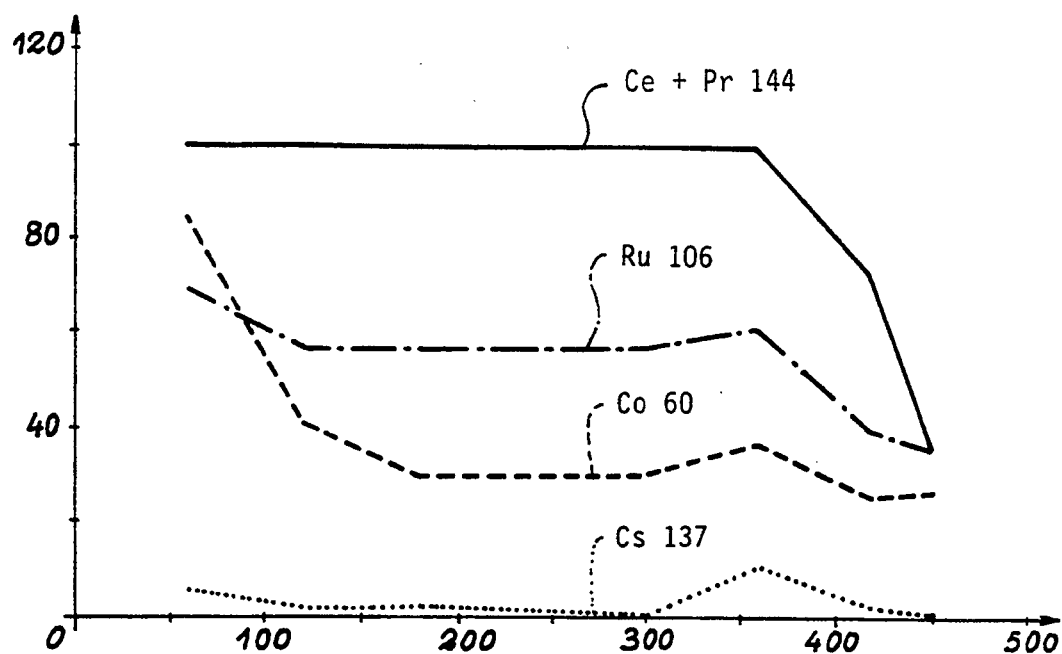
Figure 3:
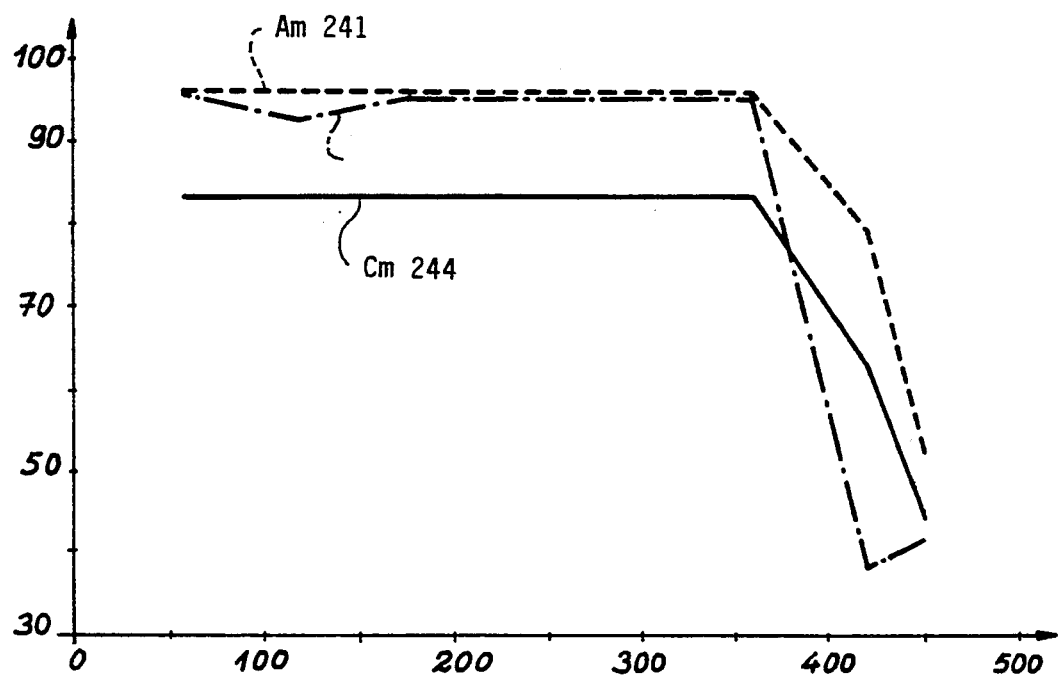

The results obtained are given in FIGS. 2 and 3. FIG. 2 shows the gamma emitter percentages (Ru106, Co60, Ce+Pr144 and Cs137) extracted as a function of the effluent volume treated (in ml). FIG. 3 shows the alpha emitter percentages (total Pu, Am241 and Cm244) extracted as a function of the treated effluent volume (in ml).

These drawings show that the extraction percentage is very high until the treated effluent volume reaches 360 ml/g of polyvinyl pyridine.

Following this first fixing, into the column are passed 30 ml of water at a rate of 3 ml/min, but introducing it into the column via the bottom in order to make it circulate in the reverse direction to that used for the effluent treatment. Following this operation, a further effluent quantity is treated in the column under the same conditions as before and the element quantities present in the treated effluent are determined. The results obtained are given in FIGS. 4 and 5.

Figure 4:
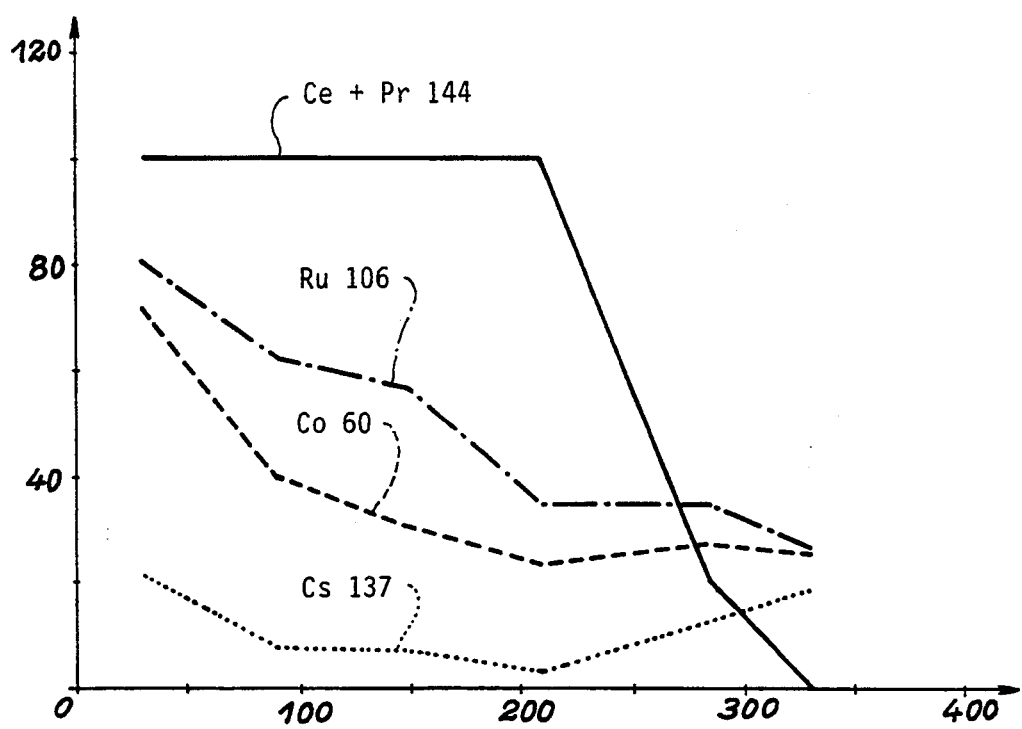
Figure 5:
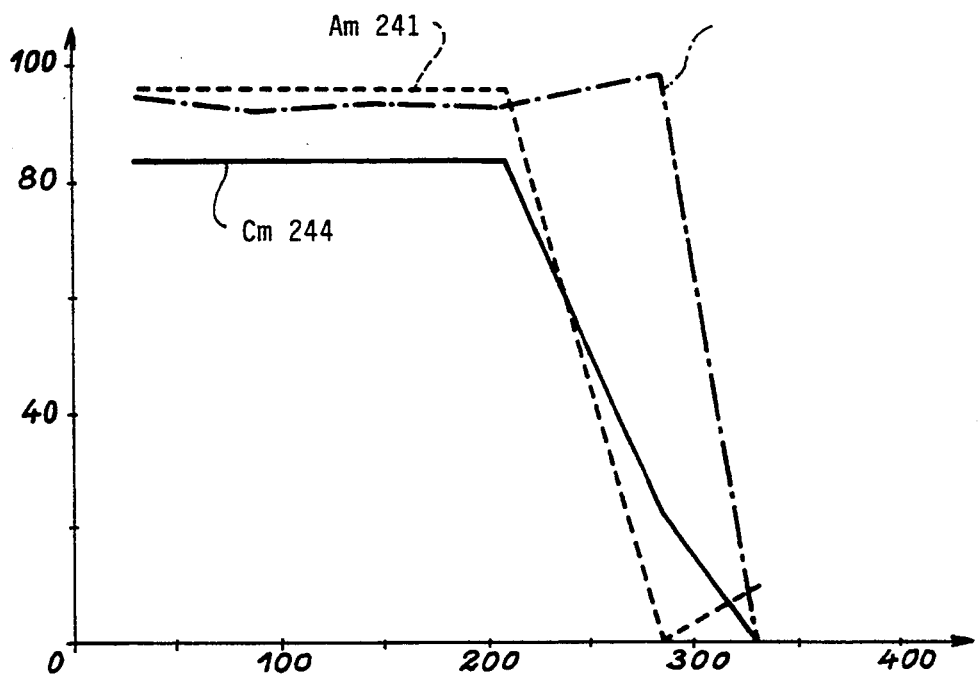

FIG. 4 shows the gamma emitter element percentages (Ru106, Co60, Ce+Pr144 and Cs137) extracted as a function of the treated effluent volume (in ml). FIG. 5 gives the alpha emitter percentages (total Pu, Am241 and Cm244) extracted as a function of the treated effluent volume (in ml).

These drawings make it clear that the effectiveness of the column is once again very good, but that the treated effluent volume is lower if it is wished to maintain a good efficiency, said volume being 210 ml of effluent per gramme of PVT for said second operation.

Thus, the treatment of an effluent in which the gamma radioelement activity is 0.654 mCi/l and the acidity 0.005M by polyvinyl pyridine makes it possible to fix 60% ruthenium and 100% of Pu, Am, Cm and Ce+Pr.

EXAMPLES 30 TO 34: DECONTAMINATION OF AVERAGE ACTIVITY EFFLUENTS

In these examples the influence of different washing solutions on the regeneration of PVP and the reextraction of Ru, Cs, Co, Mn, Ce+Pr, Sr and Pu in the washing solution is studied. In these examples use is made of the polyvinyl pyridine quantities given in table 15 for carrying out a first extraction of these different elements carrying out the contacting of the effluent with the PVP under stirring and for 30 min. The quantities of elements fixed during this first extraction are determined. The results are given in table 15 as percentages based on the quantities present in the effluent.

Following this first extraction the PVP is washed by $H_2O$, 0.1M $NH_4OH$, 0.1M $NH_4OH$+0.1M NaClO, 0.1M $HNO_3$ or 4M $HNO_3$, using a washing solution quantity such that it corresponds to the PVP concentrations in the washing solution given in table 15. This is followed by a determination of the Ru, Cs, Co, Mn, Ce+Pr, Sr and Pu contents in the washing solution.

The results obtained are also given in table 15, as percentages based on the quantities fixed on PVP. These results make it clear that most of the elements are only slightly reextracted, except for Cs and Sr which were hardly extracted by PVP.

After washing the thus washed polyvinlyl pyridine is used for treating a further medium activity effluent quantity carrying out the same contacting for 30 min and using an effluent quantity such that it corresponds to the PVP concentrations given in table 15. This is followed by the determination of the Ru, Cs, Co, Mn, Ce+Pr, Sr and Pu contents of the treated effluent. The results obtained are given as extraction percentages in table 15.

These results show that all the washing solutions are effective, although only slightly re-extracting the elements fixed during the first extraction. The extraction efficiency is even higher following a regeneration of the PVP by $HNO_3$, due to the fact that the use of 0.1M $HNO_3$ prior to a new fixing makes it possible to obtain an improved PVP effectiveness.

TABLE 15

| Ex. | | PVP g/l | $106_{Ru}$ | $137_{Cs}$ | $60_{Co}$ | $54_{Mn}$ | $141_{Ce+Pr}$ | Sr | Pu |
|---|---|---|---|---|---|---|---|---|---|
| 30 | 1st fixing | 50 | 67 | 14 | not determined | 10 | not determined | 0 | 96 |
|    | $H_2O$ washing | 16.7 | 0 | 15 | | 0 | | 15 | 2.3 |
|    | 2nd fixing | 50 | 67 | 24 | | 50 | | 9 | 96 |
| 31 | 1st fixing | 67 | 57.7 | 8.8 | 79.4 | 91.6 100 | 16.7 | 90 | |
|    | 0.1M $NH_4OH$ washing | 67 | 7.1 | 63.5 | 12 | 0 | 0 | 26 | 6.3 |
|    | 2nd fixing | 67 | 57.3 | 7.4 | 81.4 | 87.6 | 95.1 | 8.3 | 83.1 |
| 32 | 1st fixing | 67 | 57.3 | 5.9 | 78.4 | 93.6 | 100 | 8.3 | 93.8 |
|    | 0.1M $HNO_3$ washing | 67 | 4 | 97 | 41 | 77 | 12.2 | 100 | 13.6 |
|    | 2nd fixing | 67 | 82 7 | 5 9 | 90 7 | 52 | 100 | 24 3 | 93 8 |
| 33 | 1st fixing | 50 | 67 | 17 | not determined | 25 | not determined | 25 | 98 |
|    | 4M $HNO_3$ washing | 16.7 | 0 | 18 | | 0 | | 16 | 4.1 |
|    | 2nd fixing | 50 | 82 | 27 | | 35 | | not determined | 47 |
| 34 | 1st fixing | 67 | 54.5 | 5.9 | 79.4 | 92 | 100 | 33 | not determined |
|    | 0.1M $NH_4OH$ + 0.1M NaClO washing | 100 | 15 | 100 | 18 | 0 | 10.6 | 12 | not determined |

We claim:

1. Process for the separation of at least one element chosen from among Nb, Sb, Ce, Pr actinides and elements of groups VIIb and VIII of the Periodic Classification of Elements present in an aqueous solution resulting from the reprocessing of spent nuclear fuels, characterized in that it consists of contacting said aqueous solution with a solid resin based on vinyl pyridine polymer or copolymer and separating from said solution the resin which has fixed the element or elements.

2. Process according to claim 1, characterized in that the resin is polyvinyl-4-pyridine crosslinked by divinyl benzene.

3. Process according to claim 1, characterized in that the aqueous solution is a nitric solution.

4. Process according to claim 3, characterized in that the nitric acid concentration of the aqueous solution is $10^{-7}$ to 4 mole/l.

5. Process according to any one of the claims 1 to 4, characterized in that the contact time between the aqueous solution and the solid resin is 1 min to 24 h.

6. Process according to claim 1, characterized in that the resin quantity used is 10 to 500 g/l of aqueous solution.

7. Process according to any one of the claims 1 to 3, characterized in that the group VIII element is ruthenium.

8. Process according to claim 7, characterized in that the nitric acid concentrations of the aqueous solution is at the most equal to 1 mole/l and in that contacting takes place for between 10 and 60 min.

9. Process according to claim 7, characterized in that Cl- ions are added to the aqueous solution.

10. Process according to any one of the claims 1 to 3, characterized in that the group VIII element is rhodium and/or palladium.

11. Process according to claim 10, characterized in that the aqueous solution has a nitric acid concentration of 1 to 2 mole/l and in that contacting takes place for less than 10 min.

12. Process according to any one of the claims 1 to 3, characterized in that the aqueous solution is a medium or high activity effluent and from said effluent is separated ruthenium, niobium, antimony, manganese, cobalt, cerium, praseodymium, plutonium, curium and americium.

13. Process according to any one of the claims 1 to 3, characterized in that the aqueous solution is a concentrate of fission products and in that from said concentrate are separated Fe, Ni, Rh, Ru, Co and Tc.

14. Process according to any one of the claims 1 to 3, characterized in that the aqueous solution is a dissolving solution for spent nuclear fuels and in that separtion takes place from said solution of Pd, Ru, Rh, Tc, Co, Ni and Fe.

15. Process according to claim 1, characterized in that the solid resin is then regenerated by contacting it with a washing solution.

16. Process according to claim 15, characterized in that the washing solution is water, 0.1 to 4M nitric acid or 0.1M $NH_4OH$.

* * * * *